United States Patent
Keukens

(10) Patent No.: US 11,277,162 B2
(45) Date of Patent: Mar. 15, 2022

(54) ADJACENT CHANNEL SUPPRESSION BASED ON ADJACENT CHANNEL PROPERTIES IN FM RADIO BROADCAST RECEIVERS

(71) Applicant: NXP B.V., Eindhoven (NL)

(72) Inventor: Erik Keukens, Eindhoven (NL)

(73) Assignee: NXP B.V., Eindhoven (NL)

( * ) Notice: Subject to any disclaimer, the term of this patent is extended or adjusted under 35 U.S.C. 154(b) by 138 days.

(21) Appl. No.: 16/804,358

(22) Filed: Feb. 28, 2020

(65) Prior Publication Data

US 2021/0273668 A1  Sep. 2, 2021

(51) Int. Cl.
*H04B 1/10*  (2006.01)

(52) U.S. Cl.
CPC ... *H04B 1/1027* (2013.01); *H04B 2001/1045* (2013.01)

(58) Field of Classification Search
CPC .......... H04B 1/1027; H04B 2001/1045; H04B 2001/1054; H04B 1/1018
See application file for complete search history.

(56) References Cited

U.S. PATENT DOCUMENTS

| | | | |
|---|---|---|---|
| 10,999,102 B1 * | 5/2021 | Keukens | H04B 1/1027 |
| 2002/0097813 A1 * | 7/2002 | Vaidyanathan | H04L 27/066 |
| | | | 375/326 |
| 2005/0074079 A1 * | 4/2005 | Jin | H04B 1/7102 |
| | | | 375/346 |
| 2010/0130152 A1 * | 5/2010 | Whikehart | H04B 1/1036 |
| | | | 455/226.2 |
| 2017/0201293 A1 * | 7/2017 | Zhang | H04L 25/022 |
| 2021/0273668 A1 * | 9/2021 | Keukens | H04L 27/144 |

FOREIGN PATENT DOCUMENTS

JP   2004-260528 A   9/2004

OTHER PUBLICATIONS

U.S. Appl. No. 16/804,391, filed Feb. 28, 2020, entitled: FM Spectrum Estimation Relative to Adjacent Channel. The Examiner is referred to the copending patent prosecution of the common Applicant (no attachment).

* cited by examiner

*Primary Examiner* — Md K Talukder

(57) ABSTRACT

Exemplary aspects are directed to FM-radio circuitries and systems in which, at the receiving end of an FM broadcast transmission, circuitry is used to set the bandwidth for receiving the desired channel of the FM broadcast signal based on measured signal properties of immediately-adjacent channel(s) and based on an inverse relationship between an indication of FM modulation level of the other channel(s) and the amount for which the bandwidth is to be set. FM-signal processing circuitry such as logic/CPU circuitry, then receives the desired channel, including information carried by the FM broadcast signal, in response to setting the bandwidth based on the measured signal properties.

20 Claims, 2 Drawing Sheets

FM Frequency Spectrum

ADJACENT CHANNEL SUPPRESSION BASED ON ADJACENT CHANNEL PROPERTIES IN FM RADIO BROADCAST RECEIVERS

OVERVIEW

Aspects of various embodiments are directed to FM (frequency modulation) communications and including, for example, FM radio broadcast communications systems in which a desired reception channel is selected for capturing data carried by the FM, in the presence of one or more possibly-interfering adjacent channels.

In FM communications systems, accurately receiving and capturing the information provided by the carrier frequency is important. This is often achieved based on a general understanding of the surrounding frequency spectrum and by avoiding overlap and interference from other signals in the adjacent spectrum. Consider such an adjacent signal, for example, in the common FM radio broadcast systems. In such FM radio systems, interference often occurs from nearby broadcast radio signals (or channels) and the deviation of one of these adjacent broadcast signal may readily interfere with the other. The deviation or sometimes "instantaneous frequency deviation" in such systems may be sometimes referred to as the difference between the frequency of the carrier of the broadcast FM signal and its center frequency. In order to avoid overlap and interference from adjacent broadcast FM signals, this deviation may be estimated by measuring and averaging the mono-audio amplitude of the signal associated with the carrier frequency. Other deviation-estimation or tracking approaches may involve use of high-end, commercially-available AC-DC converters, such as the QPD 25-12 Series, to pursue a more stable result but for many such applications, the related expense is excessive.

Reliability for many of these deviation-measurement detectors may depend on the correct bandwidth selection of the measured channel. For some systems, an important consideration may be to ensure that the bandwidth selection of the measured signal has no energy of its adjacent channel and that no signal capture and/or measurement of the desired channel is influenced by any signal which is outside the bandwidth selected for receiving the desired channel. For example, if too narrow of a bandwidth for the measured channel is selected, the detector would indicate low modulation for this channel. Indicating such low modulation would in turn indicate that the bandwidth can be set even narrower. Depending on the used bandwidth control algorithm, this can cause further problems associated with the deviation measurements.

By using digital-signal-processing techniques, approaches for suppressing the adjacent channel have evolved from measuring the distortion in the desired channel to a system where multiple bandwidths are used to determine if a wider setting is allowed. The latter set of systems includes systems that measure distortion in a wider setting than used for audio processing and also systems that use wider bandwidth in combination with more narrow setting to find the energy of the adjacent channel that is near the desired channel.

For those systems using wider bandwidth in combination with a more narrow setting to find adjacent-channel energy, the approach takes into account the level difference of the two channels for predicting the potential distortion. A potential problem with this approach, however, is that the systems can suffer from latch up. When a too small bandwidth is selected the system will erroneously indicate the energy of the desired channel as being the energy of the adjacent channel, leading to a further reduction of the selected bandwidth.

Specific examples of the present disclosure are applicable to the standards imposed by different countries or jurisdictions on such communications systems. In European FM broadcast systems, for example, the channel spacing standard is 100 kHz and the maximum deviation is 75 kHz. This means that between two channels there is a possible overlap of 50 kHz where energy of both channels may reside at any given moment, thereby increasing the likelihood of adjacent channel breakthrough (interfering with the data carried by the desired channel). Similar FM broadcast issues exist in other regions such as in certain Asian regions (e.g., China) and in the USA. In the USA, the channel spacing standard is 200 kHz and the maximum deviation is 150, leading to possible overlap of 100 kHz.

In accordance with the present disclosure, various example embodiments are directed to issues such as those addressed above and/or as may be apparent from the following disclosure concerning detection in such FM broadcasting contexts. In one example involving a relatively less-complex circuit implementation, the bandwidth of the wanted channel is based on the modulation of the adjacent channel. The larger the modulation measured on the adjacent channel the more narrow the bandwidth of the wanted channel. One of various methods can be used to measure the modulation, appreciating or taking into account that where more reliable detection obviously leads to a more reliable system.

According on another related example, the present disclosure is directed to a method and related FM receiver circuitry that sets a bandwidth for receiving a desired channel of a frequency modulated (FM) broadcast signal based on measured signal properties of the channel or channels immediately adjacent to the desired channel. Based on an inverse relationship between an indication of FM modulation level of the other channel(s) and an amount for the setting of the bandwidth, the radio receiver processes the desired channel for discerning the information carried by the FM signal. In this manner, the bandwidth setting is selected based on and in response to the measured signal properties of the adjacent channel(s) in the broadcast.

In a more specific example for which the system includes signal-processing circuitry, the above-characterized method further includes the system's signal-processing circuitry measuring certain of these signal properties including, for example, the indication of FM modulation level of the other channel.

In another specific example, the measured signal properties include an indication of amplitude-level difference between a measured amplitude of the desired channel and a measured amplitude of the other channel.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
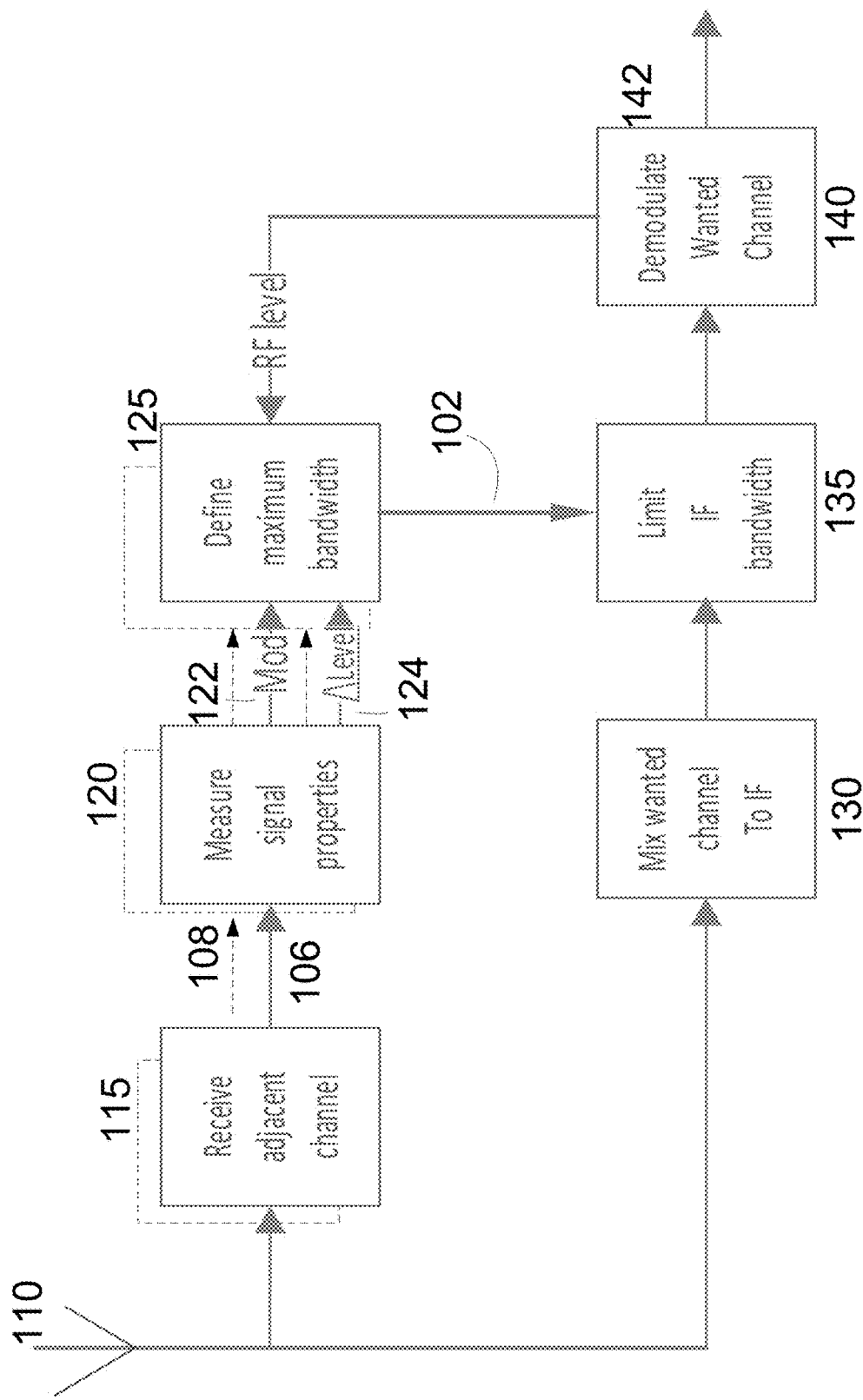
FIG. 1 is a circuit-based block diagram of a radio-frequency (FM) radio receiver, illustrating an example apparatus in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving reception and/or processing of a desired channel or signal ensuing from a frequency modulated (FM) broadcast transmission. This type of transmission may occur, for example, by way of the broadcasting from radio transmitters operated on behalf of publically-broadcast FM radio stations. While aspects of the present disclosure have been shown to be beneficial when used in the context of such FM radio broadcast signals and while the following discussion uses this context as examples to understand such aspects, the present disclosure is not necessarily so limited.

Accordingly, the present disclosure provides various specific examples with aspects and related details for discussion purposes. It should be apparent to one skilled in the art, however, that one or more other examples and/or variations of these examples may be practiced without all the specific details provided herein. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In specific examples according to the present disclosure, embodiments involve processing an FM broadcast signal (e.g., as received via an FM broadcast transmission) in a frequency spectrum having separable segments respectively corresponding to different channels associated with the broadcast radio signals. As is conventional, the information relevant to the broadcast is carried by modulating a carrier signal, sometimes the desired signal or channel; this desired channel may be typically selected by setting the bandwidth known, from historical or empirical evidence, to correspond to the frequency of the carrier signal and to avoid interference energy from adjacent channels. As noted previously, however, it is often a challenge to select the proper range for this bandwidth so that only the energy of the desired channel is captured. In connection with the present disclosure and for certain example embodiments, it has been discovered that such proper bandwidth range selection can be realized by measuring signal properties of one or both channels immediately adjacent to the desired channel and effecting the setting (to select the proper range for this desired bandwidth) based on the modulation of the immediately-adjacent channel(s). The larger the measured level modulation measured on the adjacent channel(s), the more narrow the bandwidth of the desired channel is to be set. Various methods can be used to measure the modulation but it is appreciated that in applications requiring more selectivity, a more accurate and reliable detection method and circuitry is more important. In specific respective examples, this setting for the desired bandwidth is: based exclusively on the modulation of the immediately-adjacent channel(s); based initially and/or primarily on the modulation of the immediately-adjacent channel(s); and based initially and/or primarily on the modulation of the immediately-adjacent channel(s) and then with ongoing further measurements of modulation concerning immediately-adjacent channel(s), the setting is adjusted based on such feedback and thereby optimized relative to such further measurements. In certain implementations of the examples of the immediately-preceding discussion, the selection/control may be also based (e.g., in part) on measuring distortion of the desired channel and providing feedback to adjust the setting accordingly. In certain other specific examples including but not limited to the examples of the immediately-preceding discussion, the selection/control is not based on measuring distortion of the desired channel, respectively: at all; as part of the initial bandwidth setting; and in connection with ongoing further measurements of modulation concerning immediately-adjacent channel(s).

In yet another specific example, the measured signal properties take into account an inverse relationship between an indication of FM modulation level of the other channel and the amount for which the bandwidth is to be set. This relationship may be characterized in that: based on a relatively large indication of FM modulation level of the other channel, the step of setting a bandwidth for receiving a desired channel includes setting a relatively narrow bandwidth; whereas based on a relatively small indication of FM modulation level of the other channel, the step of setting a bandwidth for receiving a desired channel includes setting a relatively wide bandwidth.

In certain examples, aspects of the present disclosure are directed to FM circuit-based apparatuses, such as FM systems and other devices including FM receivers wherein bandwidth selection of and/or control over a desired channel may be beneficial due to potential signal distortion involving the immediately-adjacent channel(s). Various types of these FM circuit-based apparatuses are benefited by basing the bandwidth selection on an estimate of the spectrum of the adjacent channels according to aspects of the present disclosure. Based on the estimate of the spectrum and the relative strength of the channels, according to such aspects of the present disclosure, certain circuit-based approaches control the bandwidth by estimating a maximum safe bandwidth for the desired channel. By using this maximum safe bandwidth in the FM-demodulation/limiter stages, the radio circuitry is able to mitigate and/or overcome adjacent-channel issues including latch up such as discussed above.

In certain other examples, the present disclosure concerns such circuit-based bandwidth-control approaches which improve audio quality by taking into account other signal conditions. As an example, various exemplary embodiments in this regard recognize or detect a relatively-normal audio condition in the received FM signal such as when the (vast)

majority of the energy is centered near the carrier frequency. The energy associated with the received FM signal, which is dependent on the modulation, is spread over a wider frequency spectrum. In this regard, one such aspect of the circuit-based bandwidth-control approach recognizes that even when part of this spectrum is removed, there is still acceptable audio quality. In this manner, for certain implementations, the approach may provide an improved degree of audio quality by reducing the bandwidth of the desired channel to prevent the distortion of the adjacent channel.

Turning now to the drawing and relating to the above-disclosed aspects and embodiments, FIG. 1 illustrates an example of FM radio receiver circuitry showing a specific approach for providing bandwidth control for receiving a desired channel, consistent with some of the above-discussed aspects and features including measurement of and reliance on measured properties of one or both immediately-adjacent channels. It will be appreciated, however, that other circuits may also be used.

In this example of FIG. 1, an approach for providing bandwidth control involves a control signal provided via a line 102. This control signal is developed by processing a desired channel from an antenna 110. In this example approach, the antenna 110 may be used to receive an FM broadcast radio signal for presentation to a configurable receiver system with circuitry 104 configured as depicted in FIG. 1 for processing the signal relative to processing of an adjacent channel picked up by the antenna 110. A signal path for this adjacent channel is shown as 106 with data flowing from left to right through the upper row of the circuitry 104. Further, the circuitry 104 may also process other adjacent channels (e.g., one on either side of the desired channel) using the antenna 110 and/or using other not-shown antenna(s) operating in tandem, as depicted by the dashed lines in connection with an additional signal path 108 for this adjacent channel. As one of many examples of circuitry that may be used and configured as disclosed herein, the circuitry 104 may be implemented using a commercially-available product such as SAF4000 available from NXP Semiconductors N.V. Alternatively, the circuitry 104 may also be implemented as a chipset with an integrated software defined-radio approach capable of covering a variety of global broadcast audio standards, including not only FM, but others such as AM, DAB+, DRM(+) and HD.

Figure 2:
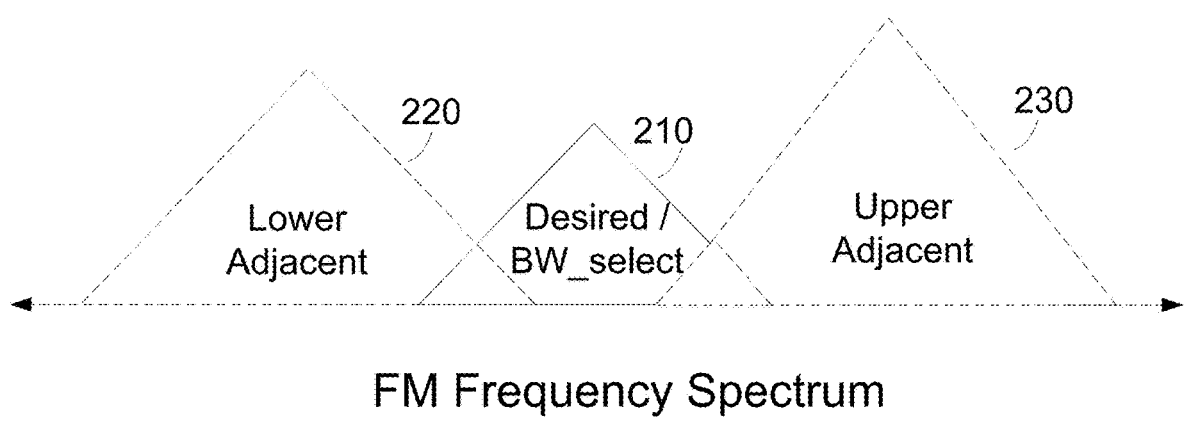
FIG. 2 is a frequency spectrum diagram, illustrating an exemplary set of overlapping channels as may be broadcast by an FM radio broadcasting system being monitored by a radio-frequency radio receiver such as disclosed in connection with FIG. 1.

In FIG. 2, a frequency spectrum diagram shows an example FM radio-broadcasting scenario in which the desired channel 210 is shown in the frequency spectrum as being between two (immediately) adjacent channels 220 and 230. Circuitry, such as disclosed in connection with FIG. 1, may be used to monitor the energy and/or modulation associated of one or both of these adjacent channels and, for certain example circuits as disclosed herein, the relevant part or all of the adjacent channel may fit within the bandwidth of the receiver system.

At the left side of FIG. 1, a bandwidth control system for an FM radio signal uses the antenna 110 to pick up the FM signal at a frequency range corresponding to the spectrum inclusive of the desired (FM) channel and at least one (immediately-adjacent) channel on either side of the desired FM channel. Also at the front end of the radio receiver or apparatus of FIG. 1, RF-filtering and amplification circuitry 115 is used to present the FM signals, which are relevant to the frequency range, to a signal-measurement/detection circuit 120. In more specific examples consistent with FIG. 1, the circuitry 115 may be configured in various ways, such as including IF bandwidth control circuitry (not shown), to receive the adjacent channel.

From the circuit 120, the relevant measured signal properties, for example, including an indication of FM modulation level of the other (possibly-interfering) channel, are presented to a bandwidth (BW) control circuit 125 which is used to set the maximum bandwidth based on these measured signal properties and using, for example, an inverse relationship relative to an indication of the FM modulation such as the modulation level and/or the modulation index.

Concurrent with the operation of the RF-filtering and amplification circuitry 115, an FM signal mixer 130 is used to down convert the received FM signal an intermediate frequency (IF) as is conventional. An output of the FM signal mixer 130 provides an IF signal to bandwidth selective/controlling circuitry 130 including, for example, a bandpass filtering circuit. Using the maximum bandwidth as provided by the circuit 125, the circuitry 135 provides a selected bandwidth range for the IF signal to be processed by a demodulator 140. In certain specific examples consistent with the example depicted in FIG. 1, the demodulator 140, which outputs the demodulated signal of the desired channel at port 142, may be further configured to provide the RF level to the bandwidth (BW) control circuit 125 so as to provide feedback and in some instances even to drive the selection (e.g., dynamically) based on ongoing further measurements of the signal properties as may be provided in an ongoing manner from the circuit 120 and/or provided from other criteria such as: based on measured distortion of the desired channel; empirical data relating to reports of previous signal receptions; and/or an method for increasing the reliability of an estimation/measurement of the RF spectrum signal properties.

As an example of such a method for increasing the reliability, the measurements used for setting the bandwidth may take into account or be a function of whether certain signal conditions are available. In applications where the spectrum of the FM signal(s) can fluctuate a lot and rapidly, it may be helpful to estimate the (relative) amplitude of the possible-interfering channel regularly or continuously so as to provide a (near) real time or adaptive spectrum estimation. In this way, the level difference between the desired (or wanted) channel and unwanted channel determines the reliability with which the spectrum may be estimated. More specifically, when the measured signal or level of the adjacent channel is strong, it has a large impact on the neighboring channel and thus an accurate estimate of the spectrum is important and, consequently, a more accurate algorithm may be used to estimate or measure the spectrum of the immediately-adjacent channels. When the measured signal is weak, the impact on the adjacent channel is limited and thus an error in this regard would have less impact. Such information may be provided as feedback (e.g., within circuit 120 of FIG. 1) so as to indicate whether the level difference corresponds to the measured signal level being significantly stronger then the level of the desired channel or otherwise (for certain examples in accordance with the instant disclosure, however, the condition where the wanted channel is significantly stronger than the measured channel need not be taken into account).

Is appreciated that the requirements on such bandwidth control systems may be less strict for a spectrum of the desired channel if nobody would be listening to the signal. For example, the adjacent channel signal can be distorted by the desired channel as well as another adjacent channel which may be one channel further away as long as it does not significantly impact the modulation spectrum estimation. As an example implementation consistent with the present disclosure, the bandwidth of the desired channel is based on the modulation of the adjacent channel with this measurement/estimation provided via one of various methods. As noted above for example in connection with the present disclosure, if a large modulation is measured on the adjacent channel, this indicates that a more-narrow bandwidth setting is appropriate for the desired channel.

In certain specific examples, a higher level difference means that for the same amount of measured modulation, a larger part of the spectrum is stronger than the desired channel and thus does impact the desired channel. In this context, one aspect of the present disclosure uses an FM receiver to provide an increased level of reliability by combining an indication of the modulation level of the adjacent channel with an indication of the modulation index. In a more specific example, such an FM radio receiver may so combine by multiplying the modulation level with another the modulation-related value, such as the modulation index. A function to shape the effect of the level may be used for optimal control. With this approach, in one example the selected bandwidth (BW) becomes:

$$\text{MaxBW-LAdj*MAdj};$$

where "LAdj" (which refers to LevelAdjacent) corresponds to the measured relative level of one of the adjacent channels or an average of both immediately-adjacent channels as on either side of the desired channel (e.g., amount "LAdj" is greater than level of the desired channel), MaxBW corresponds to the maximum bandwidth setting, and "MAdj" (which refers to ModulationAdjacent) corresponds to the other modulation parameter (e.g., index). These calculations, estimations and/or related data processing may be part of the measurements aspects performed, e.g., by the circuitry 120 of FIG. 1. It is appreciated that the properties of the function may change for changing grid and/or adjacent distances.

With reference to the example arrangement of circuitry shown in FIG. 1, in one specific example embodiment the circuitry 120 of the FM receiver includes a signal-comparison circuit such as logic and/or signal processing circuitry (not separately shown). The signal-comparison is used to indicate, for a desired channel of an FM broadcast signal, an amplitude-level difference via I/O port 124 between a measured amplitude of a desired channel in the FM broadcast signal and a measured amplitude of another channel in the FM broadcast signal that may be a potentially interfering channel. The above-noted other the modulation-related value, with which the amplitude-level difference is combined, may be provided for the adjacent channel at port 122. Using the circuitry 125, the receiver circuitry may then select a way to estimate the frequency spectrum of the other channel based on the significance of the amplitude-level difference as discussed above. In this manner, the amplitude-level difference may be used to indicate if the frequency spectrum is such that a coarse estimate of the frequency spectrum of the other channel may be used. Based on which category, the way to estimate the frequency spectrum of the other channel is selected and using this estimate and selection, the receiver processes the desired channel efficiently and accurately.

In yet other specific examples, a measurement/estimate of the higher frequency content in a demodulated FM signal may also be used to estimate the relevant portion of the spectrum. This higher frequency content leads to more Bessel components. This may be detected with very fast timing to effect adjustments in response to changing signal conditions very quickly and efficiently. In certain specific examples, there may be no compensation for the low frequency content/position in the measurement because the fast timing addresses this issue.

In theory, such measurements to characterize the possibly-relevant spectrum would involve processing to account for the Bessel components of a single tone spread across an infinite range of the spectrum. Broadcasters tend to be somewhat gentle with their used bandwidth, also broadcast equipment tend to be focused on limiting the output bandwidth. To limit the far away distortion broadcast equipment limits the output bandwidth with filters. In this regard, the effect of level difference may be limited to a certain range regarding effect of the allowed bandwidth, and above that bandwidth the filtering in the transmitter becomes dominant. Accordingly, in certain specific examples, a level range is selected for which the selected bandwidth is dependent. As an example of this dependency relationship, the selected bandwidth (BW) may be set as a function of a range associated with this level difference, as follows:

$$BW = \text{MaxBW} - f(\text{LAdj})*\text{MAdj}.$$

where "LAdj" and "MAdj" respectively refer to LevelAdjacent and ModulationAdjacent (the latter being the relative amount by which the adjacent level is stronger than the desired level as may be expressed, e.g., in dB).

Using variations of this functional relationship in accordance with the present disclosure, as examples, the bandwidth setting "output" may be as follows:

$$= \text{Limit}(((LAdj*Gain1) - \text{offset1}), MaxValue1, MinValue1) * MAdj +$$
$$\text{Limit}(((LAdj*Gain2) - \text{offset2}), MaxValue2, MinValue2);$$

or $$= \text{Limit}(((LAdj*Gain1) - \text{offset1}t), MaxValue1, MinValue1) * MAdj +$$
$$MAdj*Gain2.$$

For both of these mathematical relationships, the notations are consistent with one another and those introduced in the immediately-preceding variations (e.g., Gain1, Gain2, offset1, etc.), the values depend on the desired control levels for the given circuitry used and, in some implementations, with feedback so as to optimize the reception based on feedback and dynamic adjustment of one or more of these parameters. The setting may also be based on a minimum upper bandwidth parameter and/or a minimum lower bandwidth parameter, with each such parameter programmed into the circuitry such as 120, 125 and 135 of FIG. 1. In another related example, such a system may be configured to measure the adjacent channel properties based on its own bandwidth control limitations as may be advantageous when using the same circuitry for each such channel. Accordingly, the selected bandwidth may be set as a function of the level range in different ways.

In accordance with yet other examples, compensation is provided for the non-linearity of the modulation curve in relation to the required bandwidth reduction and in such examples the total bandwidth reduction may be estimated as follows:

$$BW = \text{MaxBW} - f(\text{LAdj}, \text{MAd}), \text{ where } f \text{ can be an arbitrary function.}$$

It is appreciated that the properties of such a function may change for changing grid/adjacent distance and that, in case of an adjacent channel at both sides of the desired channel, each side the maximum bandwidth may be determined, thereby resulting in:

$$BW = \text{minimum}(BW_{upper}, BW_{lower}),$$

where $BW_{upper}$ indicates selected bandwidth as a result of the upper adjacent channel, and $BW_{lower}$ indicates selected bandwidth as a result of the lower adjacent channel.

In certain non-limiting experimental-test embodiments, the above-described approaches for estimating deviation and setting the bandwidth for the desired channel has realized impressive results. One such system embodiment has been tested successfully with several types of audio (including short audio bursts, with silence in between, wide spectrum audio, etc.). In all tested situations, the desired channel has been maintained as clean of interference and/or breakthrough due to the adjacent channel. This has been realized successfully in this clean regard even with the bandwidth, associated with the content of the adjacent channel, fluctuating, and also with: several settings of the signal level difference; testing performed on 100 kHz adjacent channel, 200 kHz adjacent channel and 300 kHz adjacent channel; and where the disturbing channel was at 100 kHz, while an even stronger channel was available at 200 kHz difference.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, processor, converter, controller, and/or other circuit-type depictions (e.g., reference numerals/blocks in FIGS. 1 and 2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown and discussed in the present disclosure. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described above is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not necessarily depart from the true spirit and scope of various aspects of the disclosure, including aspects set forth in the claims.

What is claimed is:

1. A method comprising:
   setting a bandwidth for receiving a desired channel of a frequency modulated (FM) broadcast signal based on measured signal properties of another channel that is immediately adjacent to the desired channel and based on an inverse relationship between an indication of FM modulation level of the other channel and an amount for the setting of the bandwidth; and
   receiving the desired channel, including information carried by the FM broadcast signal, in response to setting the bandwidth based on the measured signal properties;
   wherein setting the bandwidth includes accounting for the signal properties as a function of a selected maximum bandwidth minus an amplitude-level difference between a measured amplitude of the desired channel and a measured amplitude of the other channel, as multiplied by an indication of FM modulation level of the other channel.

2. The method of claim 1, further including signal-processing circuitry measuring the signal properties including the indication of FM modulation level of the other channel.

3. The method of claim 1, wherein the signal properties include an indication of amplitude-level difference between a measured amplitude of the desired channel and a measured amplitude of the other channel.

4. The method of claim 1, wherein the inverse relationship between an indication of FM modulation level of the other channel and the amount is characterized in that: based on a relatively large indication of FM modulation level of the other channel, the step of setting a bandwidth for receiving a desired channel includes setting a relatively narrow bandwidth; and
   whereas based on a relatively small indication of FM modulation level of the other channel, the step of setting a bandwidth for receiving a desired channel includes setting a relatively wide bandwidth.

5. The method of claim 1, wherein setting a bandwidth includes accounting for the signal properties as a function of a selected maximum bandwidth minus: an indication or function of amplitude-level difference between a measured amplitude of the desired channel and a measured amplitude of the other channel, as multiplied by an indication of FM modulation level of the other channel.

6. The method of claim 1, wherein setting a bandwidth includes accounting for the signal properties as a function of a selected maximum bandwidth minus a function of both: amplitude-level difference between a measured amplitude of the desired channel and a measured amplitude of the other channel, and an indication of FM modulation level of the other channel.

7. The method of claim 1, further including signal-processing circuitry measuring the signal properties as including one or more of the following: an indication of a measured amplitude of the other channel impacts spectrum corresponding to bandwidth control provided for the desired channel; an indication of amplitude-level difference between a measured amplitude of the desired channel; and a measured amplitude of the other channel.

8. The method of claim 1, wherein the step of setting the bandwidth is performed by a FM radio receiver having circuitry which measures or estimates modulation of channels on each side of the desired channel.

9. The method of claim 1, wherein the step of setting the bandwidth is performed by a FM radio receiver having circuitry which uses an amplitude of a possible-interfering channel regularly or continuously so as to provide an adaptive spectrum estimation.

10. The method of claim 1, wherein the signal properties include an indication of amplitude-level difference between a measured amplitude of the desired channel and a measured amplitude of the other channel, and wherein the step of setting the bandwidth is based on a limited range of the level difference, and thereby setting a maximum allowed bandwidth dependent on the range.

11. The method of claim 10, wherein the step of setting the bandwidth is based on minimum upper bandwidth parameter and a minimum lower bandwidth parameter.

12. The method of claim 1, wherein the FM broadcast signal is used in a European region.

13. The method of claim 1, wherein the FM broadcast signal is used in a North American region.

14. The method of claim 1, wherein the FM broadcast signal is used in a region of Asia.

15. An apparatus comprising:
  circuitry to set a bandwidth for receiving a desired channel of a frequency modulated (FM) broadcast signal based on measured signal properties of another channel that is immediately adjacent to the desired channel and based on an inverse relationship between an indication of FM modulation level of the other channel and an amount the bandwidth is to be set; and
  FM-signal processing circuitry to receive the desired channel, including information carried by the FM broadcast signal, in response to setting the bandwidth based on the measured signal properties;
  wherein the circuitry to set the bandwidth accounts for the signal properties as a function of a selected maximum bandwidth minus an amplitude-level difference between a measured amplitude of the desired channel and a measured amplitude of the other channel, as multiplied by an indication of FM modulation level of the other channel.

16. The apparatus of claim 15, wherein the inverse relationship between an indication of FM modulation level of the other channel and the amount is characterized in that: based on a relatively large indication of FM modulation level of the other channel, the step of setting a bandwidth for receiving a desired channel includes setting a relatively narrow bandwidth; and whereas based on a relatively small indication of FM modulation level of the other channel, the step of setting a bandwidth for receiving a desired channel includes setting a relatively wide bandwidth.

17. The apparatus of claim 15, further including circuitry to measure and generate the measured signal properties of one channel or a pair of channels that is immediately adjacent to the desired channel.

18. The apparatus of claim 15, further including circuitry to measure the signal properties including an indication of a measured amplitude of the other channel impacting spectrum corresponding to bandwidth control provided for the desired channel; and wherein the circuitry to set a bandwidth accounts for measured signal properties of yet another channel that is immediately adjacent to and on another side of the desired channel.

19. The apparatus of claim 15, further including circuitry to measure the signal properties including at least two of the following: an indication of a measured amplitude of the other channel impacting spectrum corresponding to bandwidth control provided for the desired channel; an indication of amplitude-level difference between a measured amplitude of the desired channel; and a measured amplitude of the other channel.

20. A method comprising:
  setting a bandwidth for receiving a desired channel of a frequency modulated (FM) broadcast signal based on measured signal properties of another channel that is immediately adjacent to the desired channel and based on an inverse relationship between an indication of FM modulation level of the other channel and an amount for the setting of the bandwidth; and
  receiving the desired channel, including information carried by the FM broadcast signal, in response to setting the bandwidth based on the measured signal properties;
  wherein setting a bandwidth includes accounting for the signal properties as a function of a selected maximum bandwidth minus an indication or function of amplitude-level difference between a measured amplitude of the desired channel and a measured amplitude of the other channel, as multiplied by an indication of FM modulation level of the other channel.

* * * * *